United States Patent
Anderson

(10) Patent No.: US 9,734,866 B2
(45) Date of Patent: Aug. 15, 2017

(54) PERCEPTUAL COMPUTING INPUT TO DETERMINE POST-PRODUCTION EFFECTS

(71) Applicant: Intel Corporation, Santa Clara, CA (US)

(72) Inventor: Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,370

(22) Filed: Sep. 25, 2015

(65) Prior Publication Data

US 2017/0092321 A1 Mar. 30, 2017

(51) Int. Cl.
| | |
|---|---|
| G11B 27/00 | (2006.01) |
| H04N 5/93 | (2006.01) |
| G11B 27/022 | (2006.01) |
| G06K 9/00 | (2006.01) |
| G06F 3/01 | (2006.01) |
| G06T 13/00 | (2011.01) |
| H04N 5/77 | (2006.01) |

(52) U.S. Cl.
CPC ........... *G11B 27/022* (2013.01); *G06F 3/016* (2013.01); *G06K 9/00711* (2013.01); *G06T 13/00* (2013.01); *G06K 2009/00738* (2013.01)

(58) Field of Classification Search
CPC ............ H04N 5/77; H04N 5/93; G11B 27/00
USPC ................. 386/280, 278, 228, 239, 248
See application file for complete search history.

(56) References Cited

U.S. PATENT DOCUMENTS

| | | | | |
|---|---|---|---|---|
| 9,191,579 | B2 * | 11/2015 | Seidel | ............ G06T 17/10 |
| 2002/0191952 | A1 * | 12/2002 | Fiore | ............ H04N 5/76 386/217 |
| 2005/0041008 | A1 * | 2/2005 | Lee | ............ G09G 3/3406 345/102 |
| 2011/0102469 | A1 * | 5/2011 | Kami | ............ A63F 13/52 345/682 |
| 2012/0050324 | A1 | 3/2012 | Jeong et al. | |
| 2014/0348489 | A1 | 11/2014 | Stephens et al. | |
| 2015/0009364 | A1 * | 1/2015 | Anderson | ......... G06F 17/30265 348/231.3 |
| 2015/0070150 | A1 | 3/2015 | Levesque et al. | |
| 2015/0235089 | A1 | 8/2015 | Lee et al. | |
| 2015/0262376 | A1 | 9/2015 | Saboune et al. | |

FOREIGN PATENT DOCUMENTS

WO 2014209279 A1 12/2014

OTHER PUBLICATIONS

Anderson et al., "Techniques and Apparatus for Editing Video" pending U.S. Appl. No. 14/459,229, filed Aug. 13, 2014.

(Continued)

*Primary Examiner* — Daquan Zhao
(74) *Attorney, Agent, or Firm* — Jordan IP Law, LLC

(57) ABSTRACT

Systems, apparatuses and methods may provide for detecting an event in visual content including one or more of a video or a still image and searching an effects database for a post-production effect that corresponds to the event. Additionally, the post-production effect may be automatically added to the visual content. In one example, adding the post-production effect includes adjusting one or more of a display backlight level or a display position setting of a device that presents the visual content.

20 Claims, 5 Drawing Sheets

(56) References Cited

OTHER PUBLICATIONS

Anderson et al., "Augmentation of Stop-Motion Content" pending U.S. Appl. No. 14/567,117, filed Dec. 11, 2014.
International Search Report and Written Opinion for International Patent Application No. PCT/US2016/047781, mailed on Nov. 24, 2016, 14 pages.

* cited by examiner

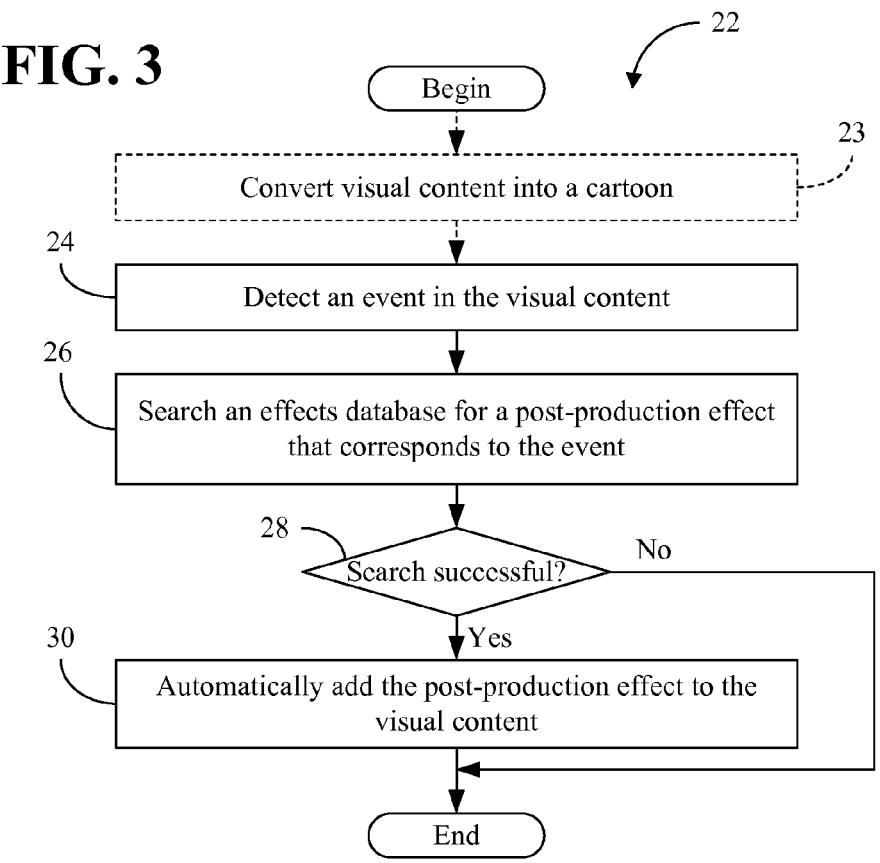
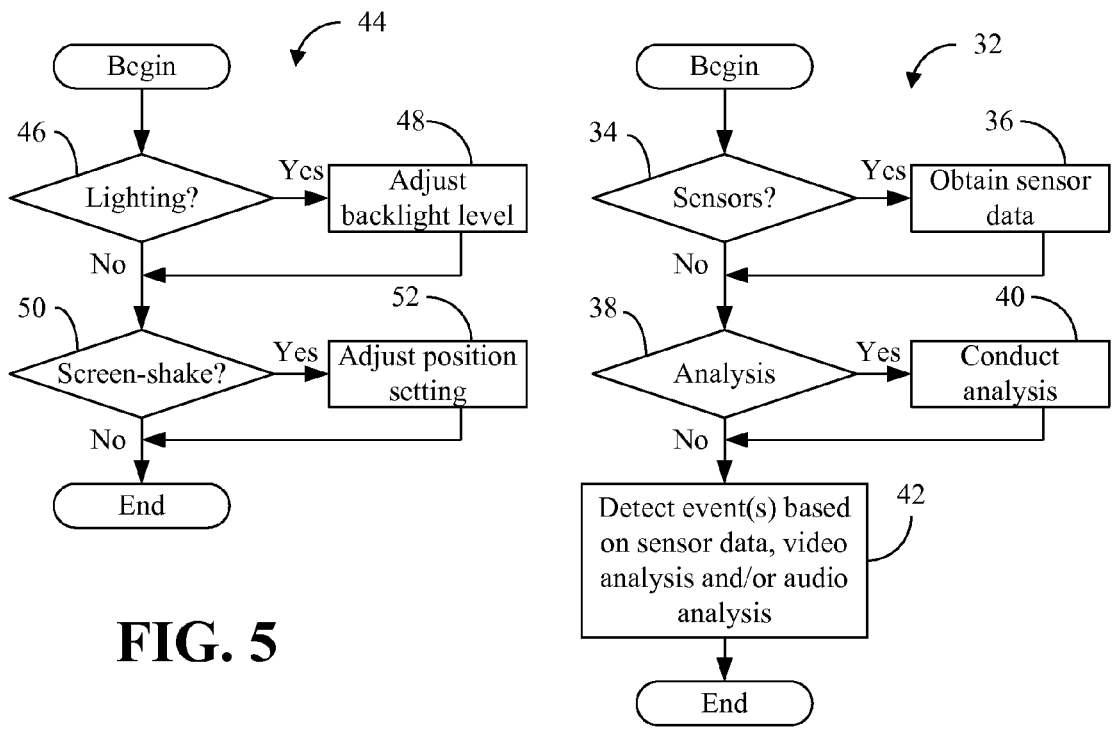

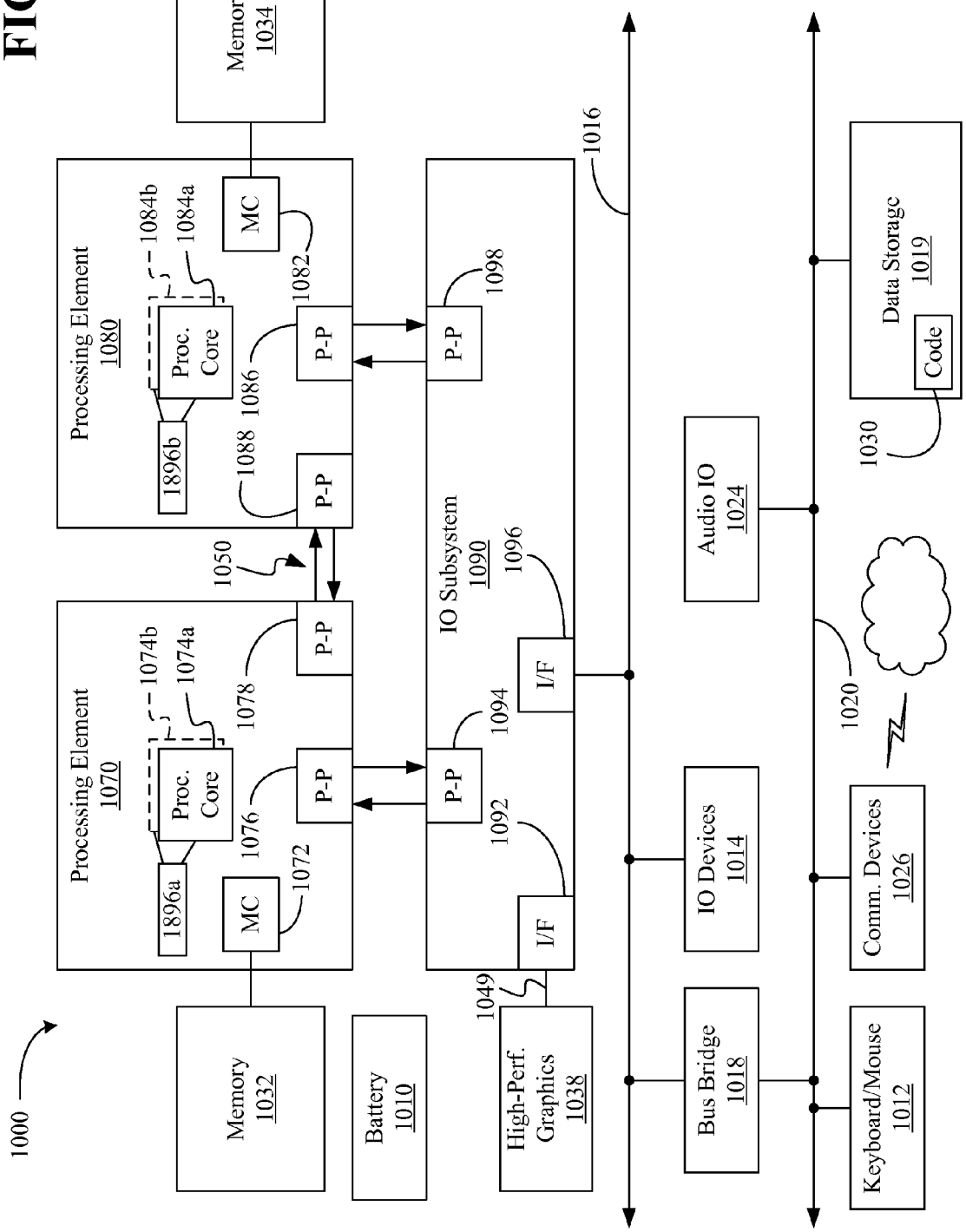

PERCEPTUAL COMPUTING INPUT TO DETERMINE POST-PRODUCTION EFFECTS

TECHNICAL FIELD

Embodiments generally relate to perceptual computing. More particularly, embodiments relate to perceptual computing input to determine post-production effects.

BACKGROUND

Augmented reality (AR) applications may overlay video content with virtual and/or animated characters that interact with the environment shown in the video content. Conventional AR solutions, however, may involve complex video production techniques that are costly, time consuming and power inefficient.

BRIEF DESCRIPTION OF THE DRAWINGS

The various advantages of the embodiments will become apparent to one skilled in the art by reading the following specification and appended claims, and by referencing the following drawings, in which:

FIG. 3 is a flowchart of an example of a method of operating a perceptual effects apparatus according to an embodiment;

FIG. 4 is a flowchart of an example of a method of detecting events in visual content according to an embodiment;

FIG. 5 is a flowchart of an example of a method of adding post-production effects to visual content according to an embodiment;

FIG. 8 is a block diagram of an example of a computing system according to an embodiment.

DESCRIPTION OF EMBODIMENTS

Figure 1:
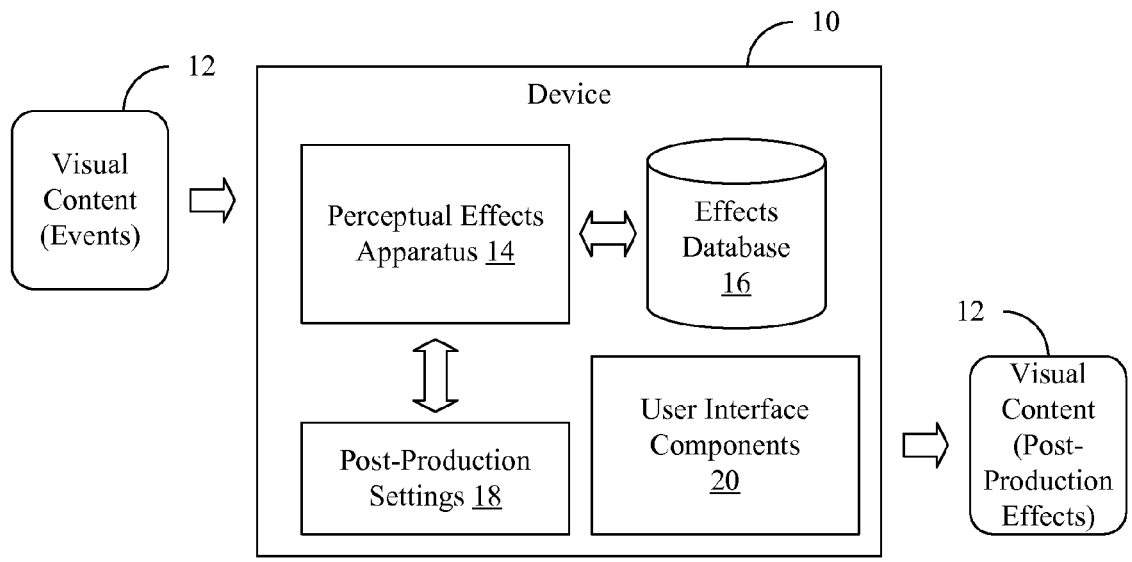
FIG. 1 is a block diagram of an example of a content enhancement scenario according to an embodiment.

Turning now to FIG. 1, a content enhancement scenario is shown in which a device 10 (e.g., desktop computer, notebook computer, tablet computer, convertible tablet, personal digital assistant/PDA, mobile Internet device/MID, wearable computer, camera, camcorder, media player, etc., or any combination thereof) obtains visual content 12 such as, for example, a video and/or still image. In the illustrated example, the visual content 12 contains and/or depicts one or more events of interest. The events of interest may include, for example, visual events (e.g., subjects accelerating, decelerating, crashing, twisting, flipping, etc.), sound events (e.g., loud noises, screams, etc.), and so forth. As will be discussed in greater detail, a perceptual effects apparatus 14 may detect the events in the visual content 12 and search an effects database 16 for post-production effects that correspond to the events.

The post-production effects may be added to the visual content 12 by adjusting one or more post-production settings 18 such as, for example, display backlight levels, display position settings, etc. As a result, when the visual content 12 is presented to a user via one or more user interface components 20 (e.g., displays, haptic components, speakers, olfactory components, etc.), the visual content 12 will be enhanced by the post-production effects. Of particular note is that the post-production effects may be "global" and/or "macro" to the device 10 and the visual content 12 itself may remain unchanged. Accordingly, the illustrated solution saves cost, time and power by obviating any need for complex video production techniques such as conventional augmented reality (AR) techniques.

Figure 2:
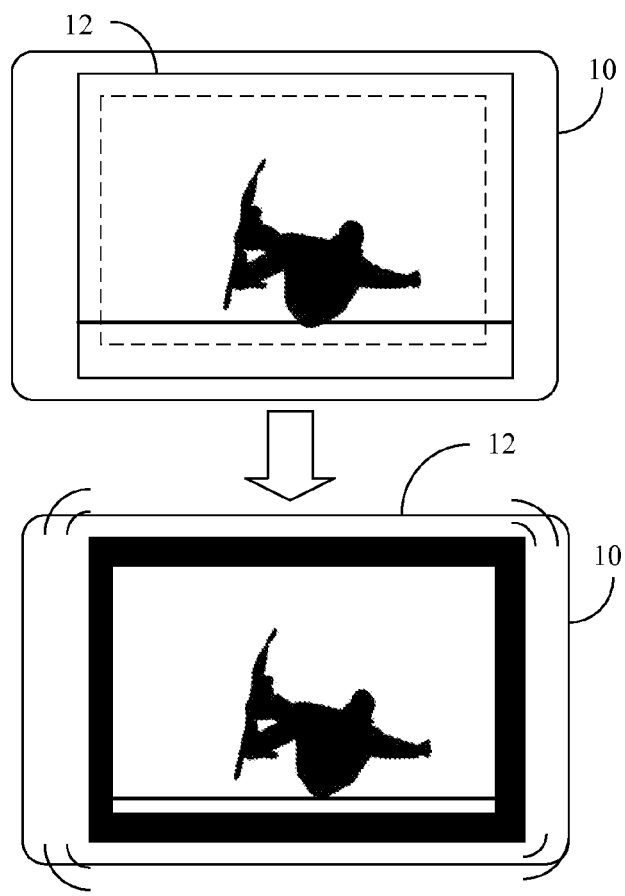
FIG. 2 is an illustration of an example of a content enhancement scenario involving a screen-shake effect according to an embodiment.

FIG. 2 shows one example in which the visual content 12 is a video of a snowboarder who falls down at a particular moment during the video. In the illustrated example, the device 10 adjusts a display position setting to create a screen-shake effect when the snowboarder falls down. For example, only a sub-area of the image may be displayed, leaving some area around the edges/perimeter. In such a case, the display position setting might be adjusted to rapidly oscillate between screen offset values and/or screen rotational values so that the user perceives a trembling and/or earthquake state in the visual content 12. As already noted, other post-production effects such as backlight level adjustments may also be made to modify the appearance of the visual content 12 without changing the visual content 12 itself.

FIG. 3 shows a method 22 of operating a perceptual effects apparatus. The method 22 may generally be implemented in a perceptual effects apparatus such as, for example, the perceptual effects apparatus 14 (FIG. 1), already discussed. More particularly, the method 22 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 22 may be written in any combination of one or more programming languages, including an object oriented programming language such as JAVA, SMALLTALK, C++ or the like and conventional procedural programming languages, such as the "C" programming language or similar programming languages.

Illustrated processing block 23 optionally converts visual content into a cartoon. Block 23 may involve conducting facial and/or object recognition of one or more video frames and/or still images, comparing the facial/object recognition results a caricature database, and rendering one or more matching caricatures in an animated environment. Additionally, illustrated block 24 detects an event in the visual content, wherein an effects database may be searched at block 26 for a post-production effect that corresponds to the event. If it is determined at block 28 that the search is successful, the post-production effect may be automatically added to the visual content at block 30. Otherwise, block 30 may be bypassed.

FIG. 4 shows a method 32 of detecting events in visual content. The method 32 may generally be substituted for block 24 (FIG. 3), already discussed. More particularly, the method 32 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 34 provides for determining whether one or more remote sensors (e.g., accelerometers, gyroscopes, cameras, microphones, touch surfaces, visual sensors, etc.) are present. The sensors may be worn by individuals depicted in the visual content, mounted to objects (e.g., balls, vehicles, snowboards, projectiles) depicted in the visual content, installed in the environment (e.g., perimeter sensors), and so forth. If remote sensors are present, block 36 may obtain/receive sensor data associated with one or more subjects (e.g., individuals, objects) depicted in the visual content. Additionally, a determination may be made at block 38 as to whether content analysis is enabled. If so, illustrated block 40 conducts the content analysis, wherein the analysis might include video analysis, audio analysis, etc., or any combination thereof. One or more events may be detected at block 42 based on the sensor data, video analysis and/or audio analysis.

FIG. 5 shows a method 44 of automatically adding post-production effects to visual content. The method 44 may generally be substituted for block 30 (FIG. 3), already discussed. More particularly, the method 44 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 46 determines whether one or more detected events is associated with a lighting effect. If so, a display backlight level may be adjusted at block 48. Block 48 may involve increasing the backlight level in order to brighten the display (e.g., in order to simulate a flash and/or highlight certain activity). Block 48 may also involve decreasing the backlight level in order to darken the display (e.g., in order to simulate a darker environment and/or deemphasize certain activity). Additionally, a determination may be made at block 50 as to whether one or more detected events is associated with a screen-shake effect. If so, a display position setting may be adjusted at block 52. Block 52 may involve adjusted the display position setting to oscillate between screen offset values and/or screen rotational values so that the user perceives a trembling and/or earthquake state.

Figure 6:
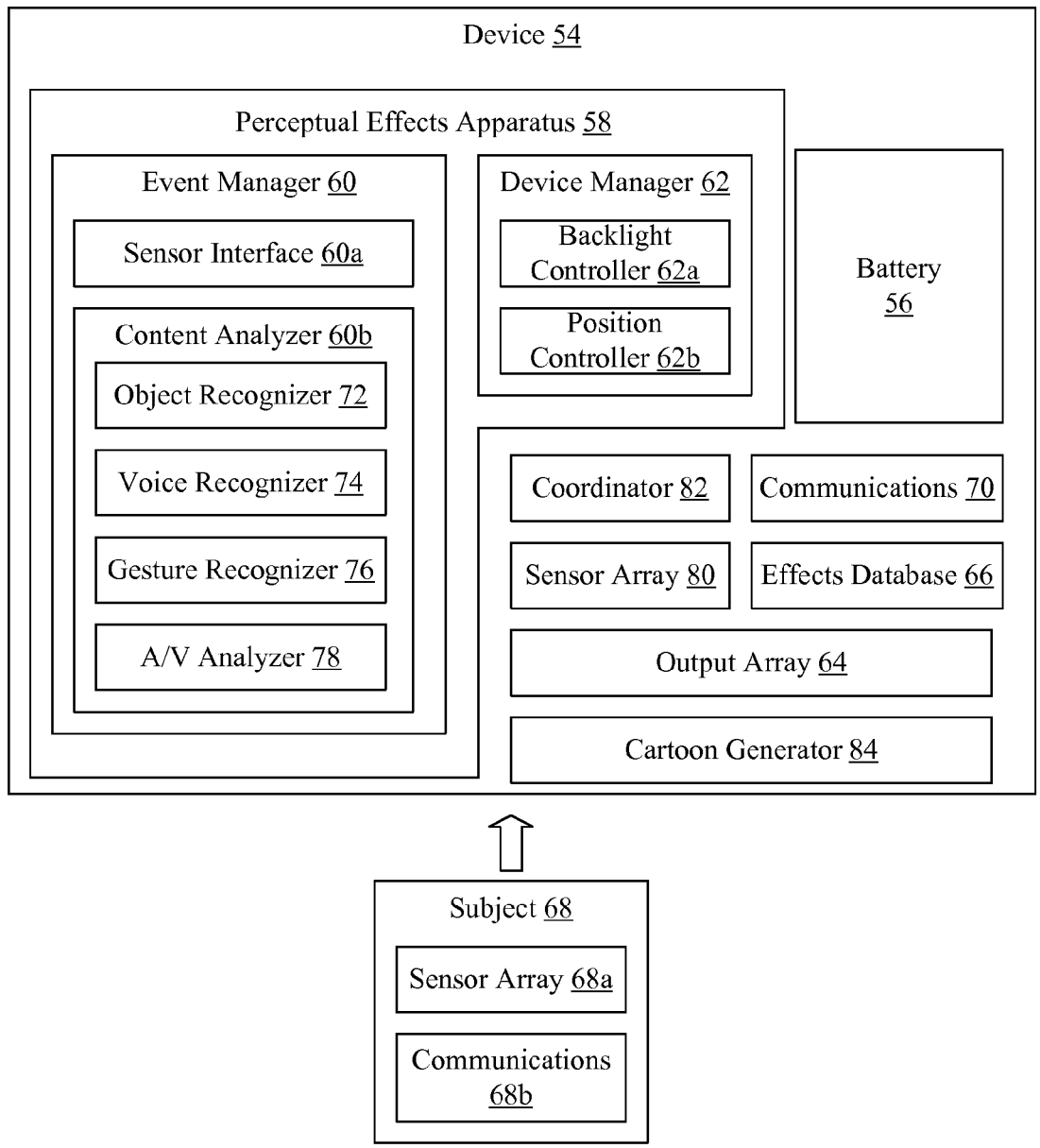
FIG. 6 is a block diagram of an example of a device according to an embodiment.

Turning now to FIG. 6, a media playback device 54 is shown in which an output array 64 (e.g., display, haptic component, speaker, etc.) presents video content including a video and/or still image, a battery 56 supplies power to the device 54 and a perceptual effects apparatus 58 includes an event manager 60 (60a-60b) and a device manager 62 (62a-62b). The event manager 60 may generally detect events in the visual content and search an effects database 66 for post-production effects that correspond to the detected events. In one example, the event manager 60 includes a sensor interface 60a that receives sensor data associated with a subject 68 (68a-68b, e.g., individual, object) depicted in the visual content. Thus, the subject 68 might include a sensor array 68a (e.g., accelerometers, gyroscopes, cameras, microphones, touch surfaces, visual sensors) that uses a communications component 68b (e.g., Bluetooth, Wi-Fi, near field communications/NFC, radio frequency identifier/RFID, etc.) to transmit the sensor data to a communications component 70 (e.g., Bluetooth, Wi-Fi, NFC, RFID, etc.) in the device 54. The sensor data may also be obtained from other sensors such as, for example, remote sensors (not shown) that monitor the environment and/or a local sensor array 80 (e.g., microphone, haptic/vibration, visual, three-dimensional/3D camera, tactile, conductance, etc.). Additionally, the sensor data may be compared to one or more thresholds to detect the events.

The event manager 60 may also include a content analyzer 60b to conduct an analysis of the visual content, wherein the analysis may include a video analysis and/or an audio analysis. More particularly, the illustrated content analyzer 60b includes an object recognizer 72, a voice recognizer 74, a gesture recognizer 76, an audio/visual (A/V) analyzer 78, and so forth. The events may therefore be detected based on the sensor data obtained by the sensor interface 60a and/or the analysis conducted by the content analyzer 60b. As already noted, an effects database 66 may be searched for post-production effects that correspond to the detected events.

Moreover, the device manager 62 may include a backlight controller 62a to adjust the backlight level of a display in the output array 64 in order to add a post-production effect to the visual content. Additionally, a position controller 62b may adjust a position setting of the display in the output array 64 in order to add a post-production effect to the visual content. In one example, the display position setting is adjusted to create a screen-shake effect. A coordinator 82 may be used to achieve the appropriate timing of the post-production effect with respect to the event in question. The illustrated device 84 also optionally includes a cartoon generator 84 to convert the visual content into a cartoon before synchronization of the post-production effect with the visual content. The device 54 may be readily substituted for the device 10 (FIGS. 1 and 2), already discussed.

Figure 7:
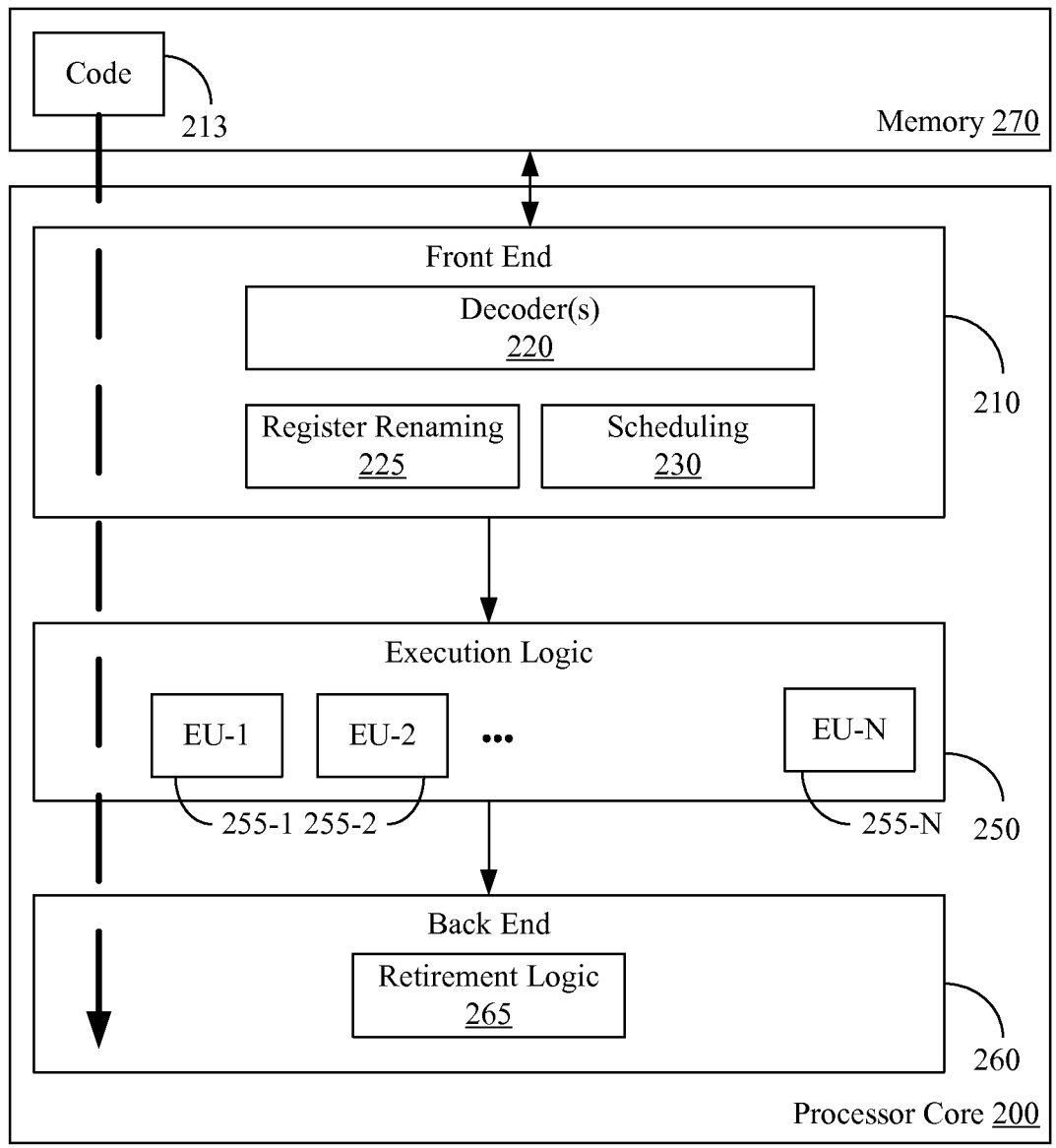
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 22 (FIG. 2), the method 32 (FIG. 4) and/or the method 44 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 22 (FIG. 2), the method 32 (FIG. 4) and/or the method 44 (FIG. 5), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 may include a media playback system comprising a display to present visual content including one or more of a video or a still image, an effects database and a perceptual effects apparatus including an event manager to detect an event in the visual content and search the effects database for a post-production effect that corresponds to the event, and a device manager to automatically add the post-production effect to the visual content.

Example 2 may include the system of Example 1, wherein the device manager includes one or more of a backlight controller to adjust a backlight level of the display or a position controller to adjust a position setting of the display.

Example 3 may include the system of Example 2, wherein the display position setting is to be adjusted to create a screen-shake effect.

Example 4 may include the system of Example 1, wherein the event manager includes a sensor interface to receive sensor data associated with a subject depicted in the visual content, and wherein the event is to be detected based on the sensor data.

Example 5 may include the system of Example 1, wherein the event manager includes a content analyzer to conduct an analysis of the visual content, and wherein the event is to be detected based on the analysis and the analysis includes one or more of a video analysis or an audio analysis.

Example 6 may include the system of any one of Examples 1 to 5, further including a cartoon generator to convert the visual content into a cartoon before addition of the post-production effect to the visual content.

Example 7 may include a perceptual effects apparatus comprising an event manager to detect an event in visual content including one or more of a video or a still image and search an effects database for a post-production effect that corresponds to the event, and a device manager to automatically add the post-production effect to the visual content.

Example 8 may include the apparatus of Example 7, wherein the device manager includes one or more of a backlight controller to adjust a display backlight level of a device that presents the visual content or a position controller to adjust a display position setting of the device that presents the visual content.

Example 9 may include the apparatus of Example 8, wherein the display position setting is to be adjusted to create a screen-shake effect.

Example 10 may include the apparatus of Example 7, wherein the event manager includes a sensor interface to receive sensor data associated with a subject depicted in the visual content, and wherein the event is to be detected based on the sensor data.

Example 11 may include the apparatus of Example 7, wherein the event manager includes a content analyzer to conduct an analysis of the visual content, and wherein the event is to be detected based on the analysis and the analysis includes one or more of a video analysis or an audio analysis.

Example 12 may include the apparatus of any one of Examples 7 to 11, further including a cartoon generator to convert the visual content into a cartoon before addition of the post-production effect to the visual content.

Example 13 may include a method of operating a perceptual effects apparatus, comprising detecting an event in visual content including one or more of a video or a still image, searching an effects database for a post-production effect that corresponds to the event, and automatically adding the post-production effect to the visual content.

Example 14 may include the method of Example 13, wherein adding the post-production effect includes adjusting one or more of a display backlight level or a display position setting of a device that presents the visual content.

Example 15 may include the method of Example 14, wherein the display position setting is adjusted to create a screen-shake effect.

Example 16 may include the method of Example 13, further including receiving sensor data associated with a subject depicted in the visual content, wherein the event is detected based on the sensor data.

Example 17 may include the method of Example 13, further including conducting an analysis of the visual content, wherein the event is detected based on the analysis and the analysis includes one or more of a video analysis or an audio analysis.

Example 18 may include the method of any one of Examples 13 to 17, further including converting the visual content into a cartoon before addition of the post-production effect to the visual content.

Example 19 may include at least one non-transitory computer readable storage medium comprising a set of instructions, which when executed by an apparatus, cause the apparatus to detect an event in visual content including one or more of a video or a still image, search an effects database for a post-production effect that corresponds to the event, and automatically add the post-production effect to the visual content.

Example 20 may include the at least one non-transitory computer readable storage medium of Example 19, wherein the instructions, when executed, cause an apparatus to adjust one or more of a display backlight level or a display position setting of a device that presents the visual content.

Example 21 may include the at least one non-transitory computer readable storage medium of Example 20, wherein the display position setting is to be adjusted to create a screen-shake effect.

Example 22 may include the at least one non-transitory computer readable storage medium of Example 19, wherein the instructions, when executed, cause an apparatus to receive sensor data associated with a subject depicted in the visual content, and wherein the event is to be detected based on the sensor data.

Example 23 may include the at least one non-transitory computer readable storage medium of Example 19, wherein the instructions, when executed, cause an apparatus to conduct an analysis of the visual content, wherein the event is detected based on the analysis and the analysis includes one or more of a video analysis or an audio analysis.

Example 24 may include the at least one non-transitory computer readable storage medium of any one of Examples 19 to 23, wherein the instructions, when executed, cause an apparatus to convert the visual content into a cartoon before addition of the post-production effect to the visual content.

Example 25 may include a perceptual effects apparatus comprising means for detecting an event in visual content including one or more of a video or a still image; means for searching an effects database for a post-production effect that corresponds to the event; and means for automatically adding the post-production effect to the visual content.

Example 26 may include the apparatus of Example 25, wherein the means for adding the post-production effect includes means for adjusting one or more of a display backlight level or a display position setting of a device that presents the visual content.

Example 27 may include the apparatus of Example 26, wherein the display position setting is to be adjusted to create a screen-shake effect.

Example 28 may include the apparatus of Example 25, further including means for receiving sensor data associated with a subject depicted in the visual content, wherein the event is to be detected based on the sensor data.

Example 29 may include the apparatus of Example 25, further including means for conducting an analysis of the visual content, wherein the event is to be detected based on the analysis and the analysis includes one or more of a video analysis or an audio analysis.

Example 30 may include the apparatus of any one of Examples 25 to 29, further including means for converting the visual content into a cartoon before addition of the post-production effect to the visual content.

Thus, techniques described herein may provide for a database of special effects in various modalities, paired with identified events and thresholds detected in video streams. A perceptual effects apparatus may look-up corresponding events in the database of special effects.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. A system comprising:
a display to present visual content including one or more of a video or a still image;
an effects database; and
a perceptual effects apparatus including,
an event manager to detect an event in the visual content and search the effects database for a post-production effect that corresponds to the event, and
a device manager to automatically add the post-production effect to the visual content,
wherein the event manager includes a sensor interface to receive sensor data associated with a subject depicted in the visual content, and wherein the event is to be detected based on the sensor data.

2. The system of claim 1, wherein the device manager includes one or more of a backlight controller to adjust a backlight level of the display or a position controller to adjust a position setting of the display.

3. The system of claim 2, wherein the display position setting is to be adjusted to create a screen-shake effect.

4. The system of claim 1, wherein the event manager includes a content analyzer to conduct an analysis of the visual content, and wherein the event is to be detected based on the analysis and the analysis includes one or more of a video analysis or an audio analysis.

5. The system of claim 1, further including a cartoon generator to convert the visual content into a cartoon before addition of the post-production effect to the visual content.

6. An apparatus comprising a processor to execute:
an event manager to detect an event in visual content including one or more of a video or a still image and search an effects database for a post-production effect that corresponds to the event; and
a device manager to automatically add the post-production effect to the visual content,
wherein the event manager includes a sensor interface to receive sensor data associated with a subject depicted in the visual content and wherein the event is to be detected based on the sensor data.

7. The apparatus of claim 6, wherein the device manager includes one or more of a backlight controller to adjust a display backlight level of a device that presents the visual content or a position controller to adjust a display position setting of the device that presents the visual content.

8. The apparatus of claim 7, wherein the display position setting is to be adjusted to create a screen-shake effect.

9. The apparatus of claim 6, wherein the event manager includes a content analyzer to conduct an analysis of the visual content, and wherein the event is to be detected based on the analysis and the analysis includes one or more of a video analysis or an audio analysis.

10. The apparatus of claim 6, further wherein the processor is to execute a cartoon generator to convert the visual content into a cartoon before addition of the post-production effect to the visual content.

11. A method comprising:
   detecting an event in visual content including one or more of a video or a still image;
   searching an effects database for a post-production effect that corresponds to the event;
   automatically adding the post-production effect to the visual content; and
   receiving sensor data associated with a subject depicted in the visual content, wherein the event is detected based on the sensor data.

12. The method of claim 11, wherein adding the post-production effect includes adjusting one or more of a display backlight level or a display position setting of a device that presents the visual content.

13. The method of claim 12, wherein the display position setting is adjusted to create a screen-shake effect.

14. The method of claim 11, further including conducting an analysis of the visual content, wherein the event is detected based on the analysis and the analysis includes one or more of a video analysis or an audio analysis.

15. The method of claim 11, further including converting the visual content into a cartoon before addition of the post-production effect to the visual content.

16. At least one non-transitory computer readable storage medium storing a set of instructions, which when executed by an apparatus, cause the apparatus to:
   detect an event in visual content including one or more of a video or a still image;
   search an effects database for a post-production effect that corresponds to the event;
   automatically add the post-production effect to the visual content; and
   receive sensor data associated with a subject depicted in the visual content and wherein the event is to be detected based on the sensor data.

17. The at least one non-transitory computer readable storage medium of claim 16, wherein the instructions, when executed, cause an apparatus to adjust one or more of a display backlight level or a display position setting of a device that presents the visual content.

18. The at least one non-transitory computer readable storage medium of claim 17, wherein the display position setting is to be adjusted to create a screen-shake effect.

19. The at least one non-transitory computer readable storage medium of claim 16, wherein the instructions, when executed, cause an apparatus to conduct an analysis of the visual content, wherein the event is detected based on the analysis and the analysis includes one or more of a video analysis or an audio analysis.

20. The at least one non-transitory computer readable storage medium of claim 16, wherein the instructions, when executed, cause an apparatus to convert the visual content into a cartoon before addition of the post-production effect to the visual content.

* * * * *